United States Patent Office 3,198,705
Patented Aug. 3, 1965

3,198,705
METHOD OF INDUCING HYPOTENSIVE AND GANGLIONIC BLOCKING ACTIVITY
John R. Cummings, Suffern, N.Y., and Arthur K. Hoffmann, Stamford, Conn., assignors to American Cyanamid Company, Stamford, Conn., a corporation of Maine
No Drawing. Filed Jan. 14, 1963, Ser. No. 250,995
3 Claims. (Cl. 167—65)

This invention relates to a new article of manufacture and to methods of using the same, more particularly it is concerned with a therapeutic composition containing the compound N,N-di-tert-butylhydroxyl ammonium chloride in dosage unit form having sympathetic nervous system blocking activity and to methods of inducing hypotension in warm blooded animals.

The ganglionlic blocking agents are generally considered to be the most potent and useful drugs available for the treatment of moderate to severe hypertension despite their often undesirable side effects. They act by blocking synaptic transmission in sympathetic autonomic ganglia and consequently, the resultant hypotension is primarily postural in nature. Although ganglioplegic drugs have many pharmacologic actions in common, there are certain fundamental differences between the various agents which are of therapeutic importance. For example, in general quaternary ammonium compounds unlike secondary amines are often poorly absorbed from the gastro intestinal tract and fail to penetrate into the central nervous system, and often produce tolerance. Ideally a hypotensive drug should effectively reduce blood pressure, should not easily become tolerated and should be capable or oral administration in moderate doses.

The present invention provides a new hypotensive agent which has an action of medium long duration and is potentially useful for the treatment of essential and malignant hypertension in humans. While its efficacy in man has not been completely elucidated, tests conducted in animals such as normotensive and hypertensive rats and dogs have shown good hypotensive action as well as ganglioplegic activity of N,N-di-tert-butylhydroxylammonium chloride. The new hypotensive agent of this invention has been described in the prior art and its method of preparation is described in detail in the examples hereinafter.

The novel compositions of matter containing N.N-di-tert-butylhydroxylammonium chloride have been found useful when the active medicinal agent is present in from about 5 mg. to about 50 mg. per dosage unit. The new orally administrable compositions of this invention are particularly useful for the inducement of hypotension in warm blooded animals.

The new compositions of the invention can be used in the form of tablets, capsules, powders or in a flavored oral suspension or an aqueous solution for parenteral use. The active ingredient N,N-di-tert-butylhydroxylammonium chloride may be associated with a pharmaceutical carrier, diluent or the like which serves to present the material in a form which will render the composition particularly useful for warm blooded animals. The pharmaceutical carrier, diluent, filled extender and/or excipient may be either a solid or liquid material, thus, the composition may take the form of capsules, tablets, powders, suspensions or other dosage forms which are particularly useful for oral ingestion. For example, suitable solid carriers, diluents and tableting adjuvants including lactose, corn starch, talc, magnesium sterate, stearic acid, cellulose powders, gums and the like. Alternatively, the pure compounds may be administered in liquid form by using suitable liquid carriers such as glycerine, oils, glycols and so forth. In still another dosage form the active material may be compounded with flavoring materials and suspending agents such as acacia, bentonite or carboxymethylcellulose in the preparation of an aqueous suspension which is particularly suitable for children and persons having difficulty in swallowing a capsule or tablet.

The invention will be described in greater detail in the following examples which contain a detailed description of making the active compound and formulations containing said compound.

*Example I.—Preparation of N,N-di-tert-butylhydroxylammonium chloride*

A 500 milliliter Erlenmeyer flask containing glass chips and a magnetic stirring bar is heated at 160–175° C. for an hour, cooled, and charged with tert-nitrobutane, 25 grams (0.24 mole). The flask is connected to a nitrogen flushed distillation apparatus and 250 milliliters of 1,2-dimethoxyethane (glyme) distilled into the flask under nitrogen. Metallic sodium, 5.5 grams (0.24 mole), cut into fine chips, is added under a nitrogen blanket and the reaction mass is stirred for 48 hours. The resulting reaction mixture is a colorless solid suspended in a colorless to pale yellow liquid. The mixture is vacuum evaporated to obtain a colorless solid shown to contain sodium nitrite, and the sodium salt of di-t-butylhydroxylamine oxide; $(t-C_4H_9)_2NO_2^-NA^+$ together with N,N,O-tri-tert-butylhydroxylamine. The solid is dried in vacuo at 50° C., and is air and moisture sensitive.

Twenty-six grams of the resulting colorless solid obtained above is dissolved in water under a nitrogen atmosphere to give a red organic immiscible layer which is separated and dried over calcium sulfate. The crude product contains small amounts of tert-nitrosobutane. Preparative vapor phase chromatography through a 5 foot column packed with silicone grease on diatomaceous earth gives 6.1 g. of pure N,N,O-tri-tert-butylhydroxylamine and 2 grams of pure N,N-di-tert-butylnitroxide.

Anhydrous hydrogen chloride is bubbled through a petroleum ether solution of N,N-di-tert-butylnitroxide. A white precipitate is formed consisting of N,N-di-tert-butylhydroxylammonium chloride together with a blue supernatant solution. The blue supernatant solution contains tert-nitrosobutane. The solid is removed by filtration and after recrystallization from either hot benzene or acetonitrile has melting point 184° C. frothing with decomposition in a sealed capillary.

*Example II.—Hypotensive activity of N,N-di-tert-butylhydroxylammonium chloride in normotensive rats*

Conscious male albino Sherman strain rats are fastened to rat boards in a supine position by means of canvas vests and limb ties. The femoral areas are anesthetized by subcutaneous infiltration of lidocaine (2-diethylamino-2′,6′-acetoxylididate). The left or right common iliac arteries are exposed and clamped off proximally by an artery clamp and distally with thread. Incisions are made near the tie and short nylon catheters are inserted and tied in place. The other end of the catheters are fitted with 24 gauge hubless needles attached to thick-walled polyethylene tubes. The test compounds are administered to the animals orally by gavage (stomach tube). The compounds are suspended or dissolved in 2% aqueous starch solution at a concentration such that 1 ml. per 100 g. of body weight gives the animal the desired dose. The volume is usually 2 ml. since the rats averaged 200 g. Mean arterial blood pressure is measured 2 hours after administration of the compounds. Comparisons are then made to the mean control blood pressure of 113 mm. Hg ±5 which is the average and standard deviation of 82 controls recorded over months of testing. Blood pressure measurements are made with four Statham P23 Db strain gauges attached to a Sanborn Polyviso Recorder. The Sanborn Polyviso Recorder is equipped with four strain gauge preamplifiers with averaging circuits for measuring mean arterial pressure.

Using this procedure, oral doses of 63 mg./kg. of N,N-di-tert-butylhydroxylammonium chloride lowered mean arterial blood pressure 27 mm. Hg (24% reduction from control) and oral doses of 10 mg./kg. caused a 19 mm. Hg lowering of mean blood pressure (17% reduction from control). The hypotensive response is relatively long; i.e., more than 8 hours but less than 24 hours.

*Example III.—Antihypertensive activity of N,N-di-tert-butylhydroxylammonium chloride in a conscious hypertensive dog*

Renal hypertension is produced in dogs by renal artery constriction with a Goldblatt clamp. A persistent elevation in blood pressure ensues as a consequence of kidney ischemia. Prior to constricting the renal artery, the mean blood pressure of one of the hypertensive animals (Dog 864) is 104 mm. Hg as determined directly by means of a Statham pressure transducer Sanborn Recorder System. Several months postoperatively, the animal's mean blood pressure is elevated to 180 mm. Hg. Ten minutes after this reading, the dog is administered N,N-di-tert-butylhydroxylammonium chloride, 10 mg./kg. orally. After dosage, the mean blood pressure values at different time periods are as follows: +115 minutes, 165 mm. Hg; +173 minutes, 157 mm. Hg; +311 minutes, 135 mm. Hg; +1394 minutes, 153 mm. Hg.

*Example IV.—Ganglioplegic activity of N,N-di-tert-butylhydroxylammonium chloride in an anesthetized dog*

The effect of N,N-di-tert-butylhydroxylammonium chloride on the autonomic nervous system is determined in dogs using the responses of the bladder and the arterial system to pre- and postganglionic stimulation as an index. Dogs are anesthetized with morphine chloralosane and urinary bladder and femoral arterial pressures are recorded on a Sanborn recorder by means of Statham pressure transducers. Stimulation of preganglionic parasympathetic fibers of the pelvic nerve with 1 volt square wave pulses at a frequency of 15 cycles/sec. for 10 secs. resulted in a contraction of the bladder. Increased tone in the partially filled bladder is indicated by increased pressure. Contractions are also induced by intravenous administrations of 10 mcg./kg. of dimethylphenylpiperazinium iodide (DMPP), a ganglionic stimulant. Postganglionic stimulation of the bladder is produced by 10 mcg. of serotonin injected intra-arterially. Intravenous DMPP also stimulates sympathetic ganglia and, consequently, evokes a vasopressor response. A direct sympathomimetic response is produced by epinephrine, 2 mcg./kg., given intravenously. N,N-di-tert-butylhydroxylammonium chloride, 5 mg./kg. intravenously, reduced or blocks the responses to ganglionic or preganglionic stimulation. In contrast, the drug enhances the responses to end organ stimulation.

*Example V*

| | Mg. |
|---|---|
| N,N-di-tert-butylhydroxylammonium chloride | 100 |
| Lactose | 100 |

The above ingredients are thoroughly mixed and placed in four or more hard gelatin capsules.

*Example VI*

| | Mgm. |
|---|---|
| N,N-di-tert-butylhydroxylammonium chloride | 300 |
| Talc | 120 |
| Starch | 1080 |

The above ingredients are thoroughly mixed, granulated using 10% gelatin solution and formed into twelve tablets.

*Example VII*

| | |
|---|---|
| N,N-di-tert-butylhydroxylammonium chloride mgm. | 150 |
| Water or physiological saline to form a concentration of 10% cc. | 12 |

The above solution after sterilization is placed in six ampules for parenteral use.

We claim:
1. A method of inducing hypotensive and ganglionic blocking activity in warm blooded animals which comprises orally administering thereto from about 5 mg. to about 50 mg. of N,N-di-tert-butylhydroxylammonium chloride in dosage unit form and a pharmaceutical carrier therefor.
2. A method of inducing hypotensive activity in warm blooded animals which comprises orally administering thereto from about 5 mg. to about 50 mg. of N,N-di-tert-butylhydroxylammonium chloride in dosage unit form and a pharmaceutical carrier therefor.
3. A method of inducing ganglionic blocking activity in warm blooded animals which comprises orally administering thereto from about 5 mg. to about 50 mg. of N,N-di-tert-butylhydroxylammonium chloride in dosage unit form and a pharmaceutical carrier therefor.

References Cited by the Examiner

FOREIGN PATENTS 876,465    9/61    Great Britain.

OTHER REFERENCES

Chemical Abstracts, vol. 56, p. 12720c, 1962.
Chemical Abstracts, vol. 46, p. 9555e, 1952.
Chemical Abstracts, vol. 49, p. 4243c, 1955.
Chemical Abstracts, vol. 51, p. 7567e, 1957.

LEWIS GOTTS, *Primary Examiner.*

FRANK CACCIAPAGLIA, JR., *Examiner.*